(12) United States Patent
Rabelo et al.

(10) Patent No.: US 10,210,385 B2
(45) Date of Patent: Feb. 19, 2019

(54) ROUTING IMAGE FRAMES TO ELEMENT DETECTORS

(71) Applicant: Hewlett-Packard Development Company, L.P., Houston, TX (US)

(72) Inventors: Andre Rabelo, Porto Alegre (BR); Edwin Marinho, Porto Alegre (BR); Victor Rocha, Porto Alegre (BR); Victor Araujo, Porto Alegre (BR); Luis Mazoni, Porto Alegre (BR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/544,695

(22) PCT Filed: Apr. 9, 2015

(86) PCT No.: PCT/US2015/025070
§ 371 (c)(1),
(2) Date: Jul. 19, 2017

(87) PCT Pub. No.: WO2016/164022
PCT Pub. Date: Oct. 13, 2016

(65) Prior Publication Data
US 2018/0032808 A1    Feb. 1, 2018

(51) Int. Cl.
*G06K 9/00* (2006.01)
*G06K 9/68* (2006.01)
(Continued)

(52) U.S. Cl.
CPC ..... *G06K 9/00456* (2013.01); *G06K 9/00979* (2013.01); *G06K 9/6807* (2013.01);
(Continued)

(58) Field of Classification Search
None
See application file for complete search history.

(56) References Cited

U.S. PATENT DOCUMENTS 5,555,435 A    9/1996   Campbell et al.
8,794,508 B1   8/2014   Pascal
(Continued)

FOREIGN PATENT DOCUMENTS

EP    0558804         7/1999
WO    WO-2007120294 A2   10/2007

OTHER PUBLICATIONS

Camcode, "Top 30 Barcode Scanner Apps for iOS and Android," (Research Paper), Apr. 9, 2014, 35 pages.
(Continued)

*Primary Examiner* — Delomia L Gilliard
(74) *Attorney, Agent, or Firm* — HP Inc. Patent Department

(57) ABSTRACT

Examples disclosed herein relate to image recognition instructions to receive a plurality of image frames, route each of the plurality of image frames to at least one of a plurality of element detectors, determine whether the respective one of the plurality of element detectors has recognized an embedded element and, in response to determining that the respective one of the plurality of element detectors has recognized the embedded element, cause a resource associated with the recognized embedded element to be retrieved.

14 Claims, 3 Drawing Sheets

(51) Int. Cl.
*G06K 7/14* (2006.01)
*G06T 1/00* (2006.01)

(52) U.S. Cl.
CPC ......... *G06K 7/1413* (2013.01); *G06K 7/1417* (2013.01); *G06K 9/00228* (2013.01); *G06K 9/6878* (2013.01); *G06T 1/0021* (2013.01)

(56) References Cited

U.S. PATENT DOCUMENTS

| | | | | |
|---|---|---|---|---|
| 2005/0018845 | A1* | 1/2005 | Suzaki | G06T 1/0028 380/243 |
| 2005/0105148 | A1 | 5/2005 | Misawa | |
| 2009/0285444 | A1* | 11/2009 | Erol | G06F 17/30253 382/100 |
| 2010/0046842 | A1 | 2/2010 | Conwell | |
| 2012/0205436 | A1* | 8/2012 | Thomas | G06K 17/0025 235/375 |
| 2012/0294524 | A1* | 11/2012 | Zyuzin | G06K 9/00456 382/166 |
| 2014/0240087 | A1* | 8/2014 | Liu | G07C 9/00103 340/5.54 |
| 2014/0281855 | A1* | 9/2014 | Bhatnagar | G06F 17/30879 715/205 |
| 2015/0016661 | A1* | 1/2015 | Lord | H04N 21/42203 382/100 |
| 2015/0085320 | A1* | 3/2015 | Palanivel | G06F 3/1208 358/2.1 |

OTHER PUBLICATIONS

Rodriguez et al., "Evolution of Middleware to Support Mobile Discovery," Jan. 30, 2015, 6 pages ~ http://www.digimarc.com/.
Wikipedia, "Round-robin DNS," Jun. 5, 2014 ~ 2 pages, <http://en.wikipedia.org/wiki/Round-robin_DNS>.
Wikipedia, "Round-robin scheduling," Sep. 22, 2014 ~ 4 pages, <http://en.wikipedia.org/wiki/Round-robin_scheduling>.

* cited by examiner

ROUTING IMAGE FRAMES TO ELEMENT DETECTORS

BACKGROUND

Image recognition allows a camera or other image capture-enabled device to scan printed or displayed content for recognizable elements. These elements may provide links to external content, such as a barcode on a sales brochure that provides a web link to additional information about a product.

BRIEF DESCRIPTION OF THE DRAWINGS

In the accompanying drawings, like numerals refer to like components or blocks. The following detailed description references the drawings, wherein.

DETAILED DESCRIPTION

As described above, a display of content, such as a printed document, a placard, brochure, projected presentation, etc., may comprise an embedded element that, upon detection and processing, may provide a resource external to the displayed content. Such a resource may comprise additional information and/or an available action associated with the content, such as a link to a web page, a request for contact, an audio/video file, etc.

In examples described herein, an embedded element may comprise a machine-readable link that may comprise an image that is optically readable by a computing device using an image capture device (e.g., a digital camera, or the like) to obtain access to a digital content resource associated with the image. A machine-readable link may comprise at least one of a barcode (e.g., a one-dimensional barcode, two-dimensional barcode, matrix barcode, QUICK RESPONSE CODE (QR CODE), or the like), a digital watermark, a target image such as a printed photograph (e.g., for use with augmented reality), a uniform resource locator (URL) or the like.

In the description that follows, reference is made to the term, "machine-readable storage medium." As used herein, the term "machine-readable storage medium" refers to any electronic, magnetic, optical, or other physical storage device that stores executable instructions or other data (e.g., a hard disk drive, random access memory, flash memory, etc.).

Figure 1:
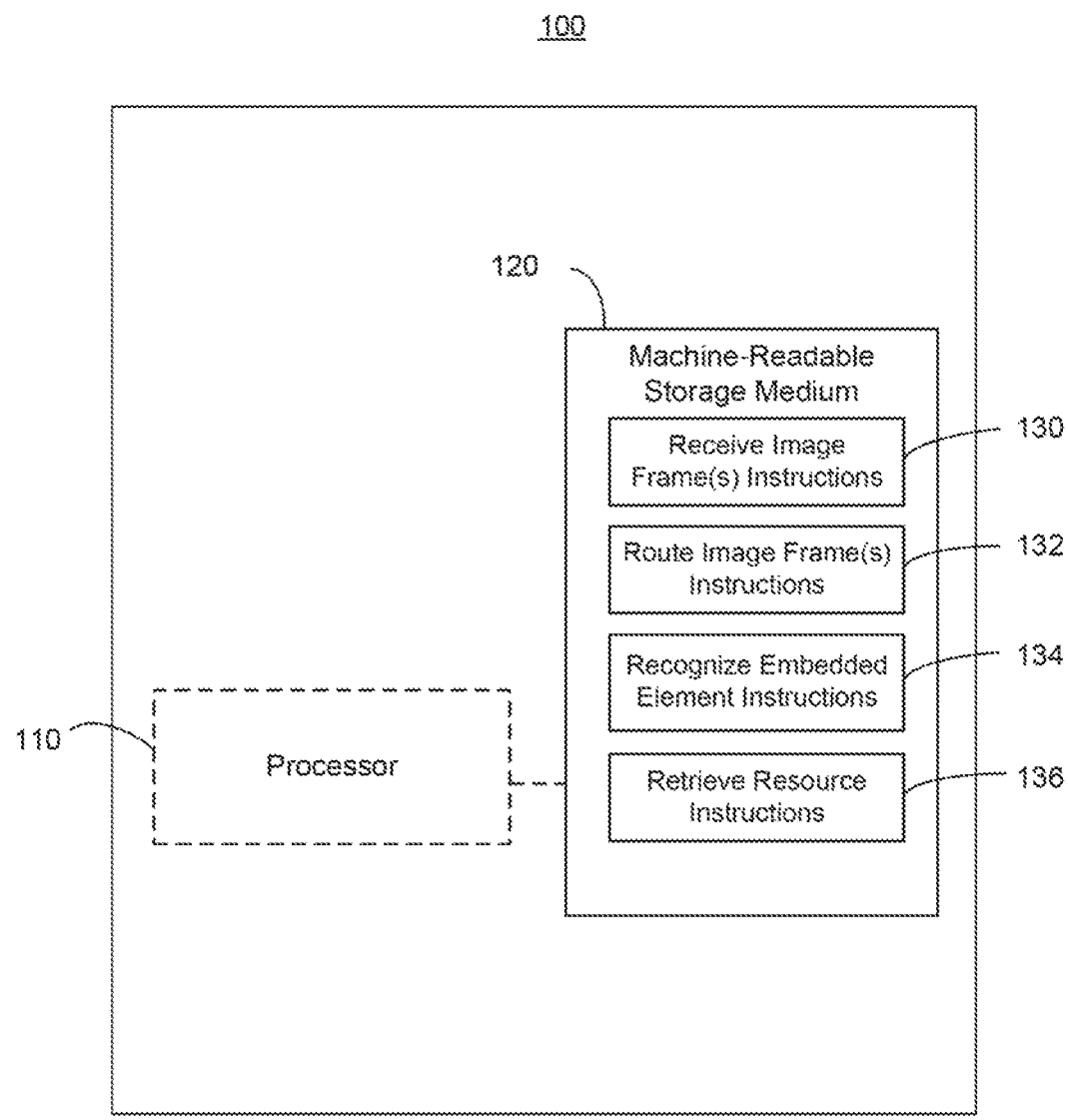
FIG. 1 is a block diagram of an example image recognition device.

Referring now to the drawings, FIG. 1 is a block diagram of an example image recognition device 100 consistent with disclosed implementations. Image recognition device 100 may comprise a processor 110 and a non-transitory machine-readable storage medium 120. Image recognition device 100 may comprise a computing device such as a server computer, a desktop computer, a laptop computer, a handheld computing device, a smart phone, a tablet computing device, a mobile phone, or the like.

Processor 110 may comprise a central processing unit (CPU), a semiconductor-based microprocessor, or any other hardware device suitable for retrieval and execution of instructions stored in machine-readable storage medium 120. In particular, processor 110 may fetch, decode, and execute a plurality of receive image frame(s) instructions 130, route image frame(s) instructions 132, recognize embedded element instructions 134, and retrieve resource instructions 136 to implement the functionality described in detail below.

Executable instructions such as receive image frame(s) instructions 130, route image frame(s) instructions 132, recognize embedded element instructions 134, and retrieve resource instructions 136 may be stored in any portion and/or component of machine-readable storage medium 120. The machine-readable storage medium 120 may comprise both volatile and/or nonvolatile memory and data storage components. Volatile components are those that do not retain data values upon loss of power. Nonvolatile components are those that retain data upon a loss of power.

The machine-readable storage medium 120 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, and/or a combination of any two and/or more of these memory components. In addition, the RAM may comprise, for example, static random access memory (SRAM), dynamic random access memory (DRAM), and/or magnetic random access memory (MRAM) and other such devices. The ROM may comprise, for example, a programmable read-only memory (PROM), an erasable programmable read-only memory (EPROM), an electrically erasable programmable read-only memory (EEPROM), and/or other like memory device.

Receive image frame(s) instructions 130 may receive a plurality of image frames from an image capture component such as a camera. The image frames may be sampled by the image capture component at a fixed and/or variable rate (e.g., 30 frames per second).

Each image frame may be associated with a content source such as a document, sign, displayed presentation, and/or other visual display. For example, some of the image frames may comprise individual captures of a page of a document. In some embodiments, subsets of the image frames may comprise little variation from one another due to the sampling rate. In some embodiments, each image frame may capture multiple content sources, such as different documents or signs.

Route image frame(s) instructions 132 may route each of the plurality of image frames sequentially to a respective one of a plurality of element detectors. For example, each unique image frame may be routed to one element detector of the plurality of element detectors. In some embodiments, no other of the plurality of element detectors will receive the same unique captured frame, although the image frames may be similar.

In some embodiments, the sequential routing may comprise a round robin style routing wherein each of the element detectors may receive one unique (i.e., different) image frame before any element detector receives a second image frame. For example, the sequential routing may proceed in rounds wherein, in each round, each of the element detectors receives one unique image frame from among a plurality of image frames (i.e., each element detector receiving a different image frame and none receiving more than one in the round). In such examples, the sequential routing may involve one round, multiple rounds, a partial round (i.e., not all element detectors receiving a frame), or a combination thereof. Route image frame(s) instructions 132 may define a sequence of detectors for receipt of the unique image frames and may distribute each frame to one of the detectors, such that successive frames are distributed according to the sequence of the detectors. The image frames may, for example, be routed to the element detectors in the same order in each round, such that for a set of element detectors A, B, and C, a first unique image is routed to element detector A, a second unique image is routed to element detector B, a third unique image is routed to element detector C, a fourth unique image is routed to element detector A, a fifth unique image is routed to element detector B, a sixth unique image is routed to element detector C, and so on.

In some embodiments, the sequential routing may comprise an adaptive style routing wherein frame routing may be based on the processing of each image frame by the respective element detector. For example, each of the element detectors may receive a unique image frame from among the plurality of image frames (i.e., each element detector receiving a different frame), but further image frames may be routed to a respective element detector that has finished processing a previously received image frame (i.e., each further unique image frame is distributed to a respective available element detector). As each of the element detectors finishes processing its respective unique image frame, it may then receive another unique image frame from route image frame(s) instructions 132. In some embodiments, this may result in faster processing element detectors receiving more frames than slower processing element detectors.

In some embodiments, receive image frame(s) instructions 130 may pre-filter each of the plurality of image frames. For example, receive image frame(s) instructions 130 may determine whether a first image frame of the plurality of image frames is in focus and, if not, discard the first image frame instead of routing the first image frame to the at least one of a plurality of element detectors. In some embodiments, the pre-filter may emphasize possible elements in the image frame, such as by obscuring and/or blacking out parts of the image frame known to not comprise recognizable elements. For example, when the element detectors comprise a QR code recognizer and a bar code recognizer, but not a text URL recognizer, the pre-filter may black out any plain text in the image frame.

Recognize embedded element instructions 134 may determine whether the respective one of the plurality of element detectors has recognized an embedded element. For example, each of the plurality of element detectors may be associated with a different element recognizer, such as a watermark recognizer, a bar code recognizer, a QR code recognizer, a text string recognizer, a uniform resource locator recognizer, a facial recognizer, an image recognizer, a stenographic halftone recognizer, and/or a microdot recognizer. The element recognizers may digitally process the image frames for elements within the image frame that correspond to a particular type of element associated with an external resource.

A first unique image frame may be routed to a first element detector comprising a QR code recognizer, for example, while a second unique image frame may be routed to a second element detector comprising a bar code recognizer. A third unique image frame may be routed to a third element detector comprising a facial recognizer, and so on.

Retrieve resource instructions 136 may, in response to determining that the respective one of the plurality of element detectors has recognized the embedded element, retrieve a resource associated with the recognized embedded element. For example, a QR code recognized by a QR code recognizer may comprise a link to a video file that may be retrieved over a network, such as a corporate network, cellular network, or public network like the Internet. For another example, a face may be recognized by a facial recognizer may be associated with retrieving a contact information resource, such as an entry in a corporate directory and/or a social media profile.

Figure 2:
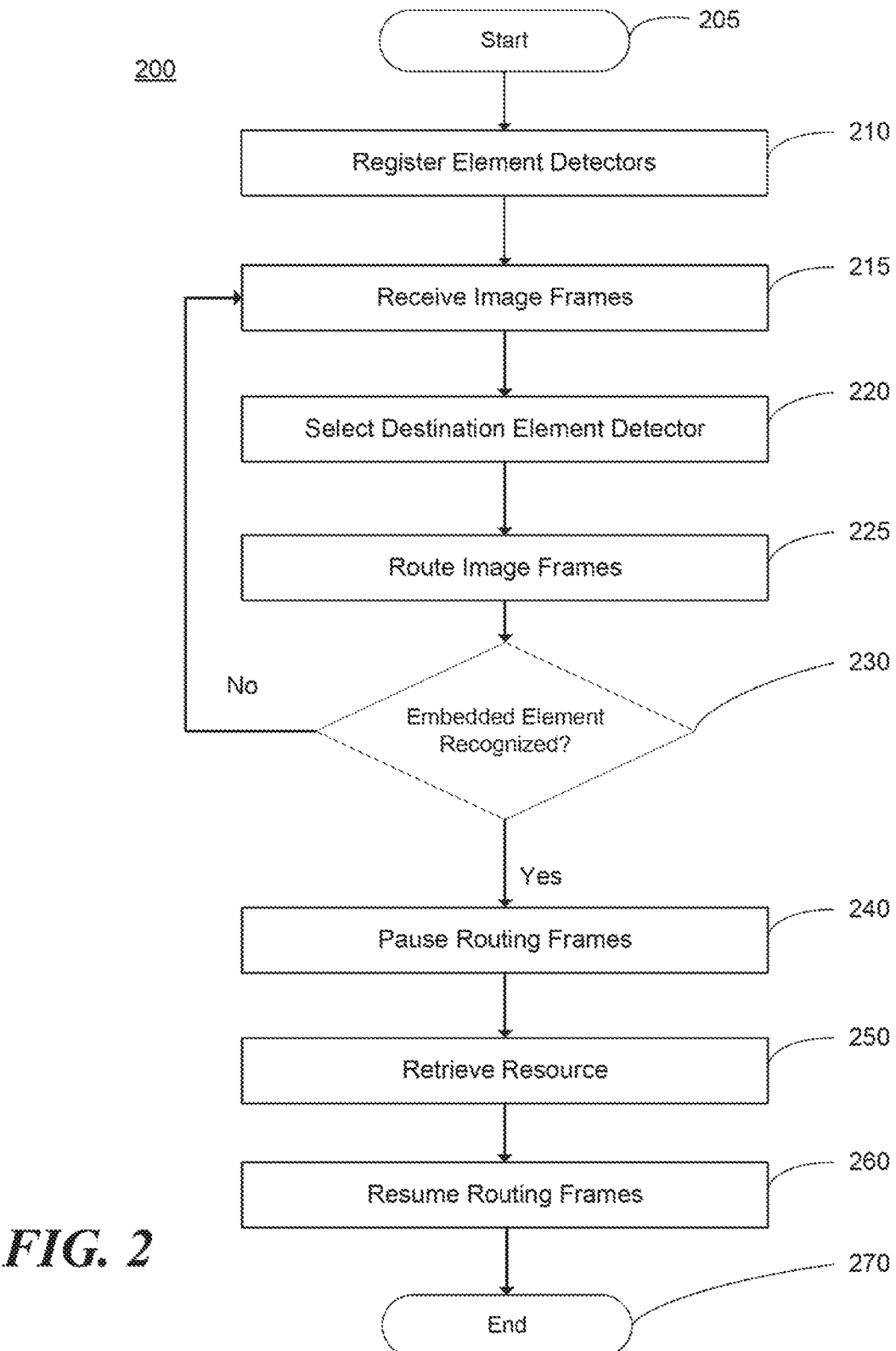
FIG. 2 is a flowchart of an example of a method for image recognition.

FIG. 2 is a flowchart of an embodiment of a method 200 for image recognition consistent with disclosed implementations. Although execution of method 200 is described below with reference to the components of image recognition device 100, other suitable components for execution of method 200 may be used.

Method 200 may start in block 205 and proceed to block 210 where device 100 may register a plurality of element detectors. For example, each of the element detectors may register its availability with device 100. In some embodiments, the element detectors may register with device 100 from a different device, such as over a network.

Method 200 may proceed to block 215 where device 100 may receive a plurality of image frames. For example, receive image frame(s) instructions 130 may receive a plurality of image frames from an image capture component such as a camera. The image frames may be sampled by the image capture component at a fixed and/or variable rate (e.g., 30 frames per second).

Each image frame may be associated with a content source such as a document, sign, displayed presentation, and/or other visual display. For example, some of the image frames may comprise individual captures of a page of a document. In some embodiments, subsets of the image frames may comprise little variation from one another due to the sampling rate.

Method 200 may proceed to block 220 where device 100 may select, for each of the plurality of image frames, a destination element detector from the plurality of element detectors. For example, device 100 may select the destination element detector in a round robin and/or an adaptive sequence.

A round robin selection may comprise selecting each of the element detectors to receive a unique image frame before any element detector receives a second image frame. In some embodiments, only one element detector may be selected for each image frame. The different image frames may, for example, be routed to the element detectors in the same order in each round.

For example, three element detectors may each be selected to receive one of three unique image frames in the first round to digitally process via an associated element recognizer. The next three unique image frames, such as may be captured by a digital camera or other image scanning component, may be subsequently routed to the three element detectors as long as the unique image frames are being captured. Each element detector may thus be supplied with a series of image frames different from the image frames received previously and subsequently by the element detector and different from the image frames received by the other element detectors.

In some embodiments, the adaptive selection may comprise selecting element detectors based on the processing of each image frame by the respective element detector. For example, all of the element detectors may each receive a first unique image frame, but further image frames may result in selection of element detectors based on which element detectors have finished processing their first unique image frame. In some embodiments, this may result in faster processing element detectors receiving more frames than slower processing element detectors.

In some embodiments, selecting the destination element detector of the plurality of element detectors may comprise identifying a sequential order for selecting the different destination element detectors of the plurality of element detectors. For example, a round robin selection may assign each of the available element detectors a sequence number (e.g., detector 1, detector 2, detector 3, etc.). This sequence number may comprise the order in which each detector receives image frames. In some embodiments, this sequence may be fixed for each round of image frame routing.

Method 200 may proceed to block 225 where device 100 may route each of the plurality of image frames to the selected destination element detector of the plurality of element detectors. For example, route image frame(s) instructions 132 may route each of the plurality of image frames sequentially to a respective one of a plurality of element detectors. Each unique image frame may be routed to one element detector of the plurality of element detectors.

In some embodiments, no other of the plurality of element detectors will receive the same unique captured frame, although the image frames may be similar. For example, a first unique image frame may be routed to a first element detector comprising a QR code recognizer, for example, while a second unique image frame may be routed to a second element detector comprising a bar code recognizer. A third unique image frame may be routed to a third element detector comprising a facial recognizer, and so on.

Method 200 may proceed to block 230 where device 100 may determine whether the selected destination element detector of the plurality of element detectors has recognized an embedded element. If no embedded element is recognized, method 200 may return to stage 215 and device 100 may continue to receive and route image frames. For example, recognize embedded element instructions 134 may determine whether the respective one of the plurality of element detectors has recognized an embedded element. For example, each of the plurality of element detectors may be associated with a different element recognizer, such as a watermark recognizer, a bar code recognizer, a QR code recognizer, a text string recognizer, a uniform resource locator recognizer, a facial recognizer, an image recognizer, a stenographic halftone recognizer, and/or a microdot recognizer. The element recognizers may digitally process the image frames for elements within the image frame that correspond to a particular type of element associated with an external resource.

In response to determining that the selected destination element detector of the plurality of element detectors has recognized the embedded element, method 200 may proceed to block 240 where device 100 may pause routing frames to the at least one of the plurality of external element detectors. For example, route image frame(s) instructions 132 may continue to route image frames to the other element detectors, but skip routing frames to the element detector that has recognized the embedded element.

Method 200 may proceed to block 250 where device 100 may retrieve a resource associated with the recognized embedded element. In some embodiments, retrieve resource instructions 136 may, in response to determining that the respective one of the plurality of element detectors has recognized the embedded element, retrieve a resource associated with the recognized embedded element. For example, a OR code recognized by a QR code recognizer may comprise a link to a video file that may be retrieved over a network, such as a corporate network, cellular network, or public network like the Internet. For another example, a face may be recognized by a facial recognizer may be associated with retrieving a contact information resource, such as an entry in a corporate directory and/or a social media profile.

Method 200 may proceed to block 260 where device 100 may resume routing frames to the selected destination element detector of the plurality of element detectors after the resource has been retrieved. For example, route image frame(s) instructions may route received image frames to the element detector in sequence with the other element detectors. Method 200 may then end at block 270.

Figure 3:
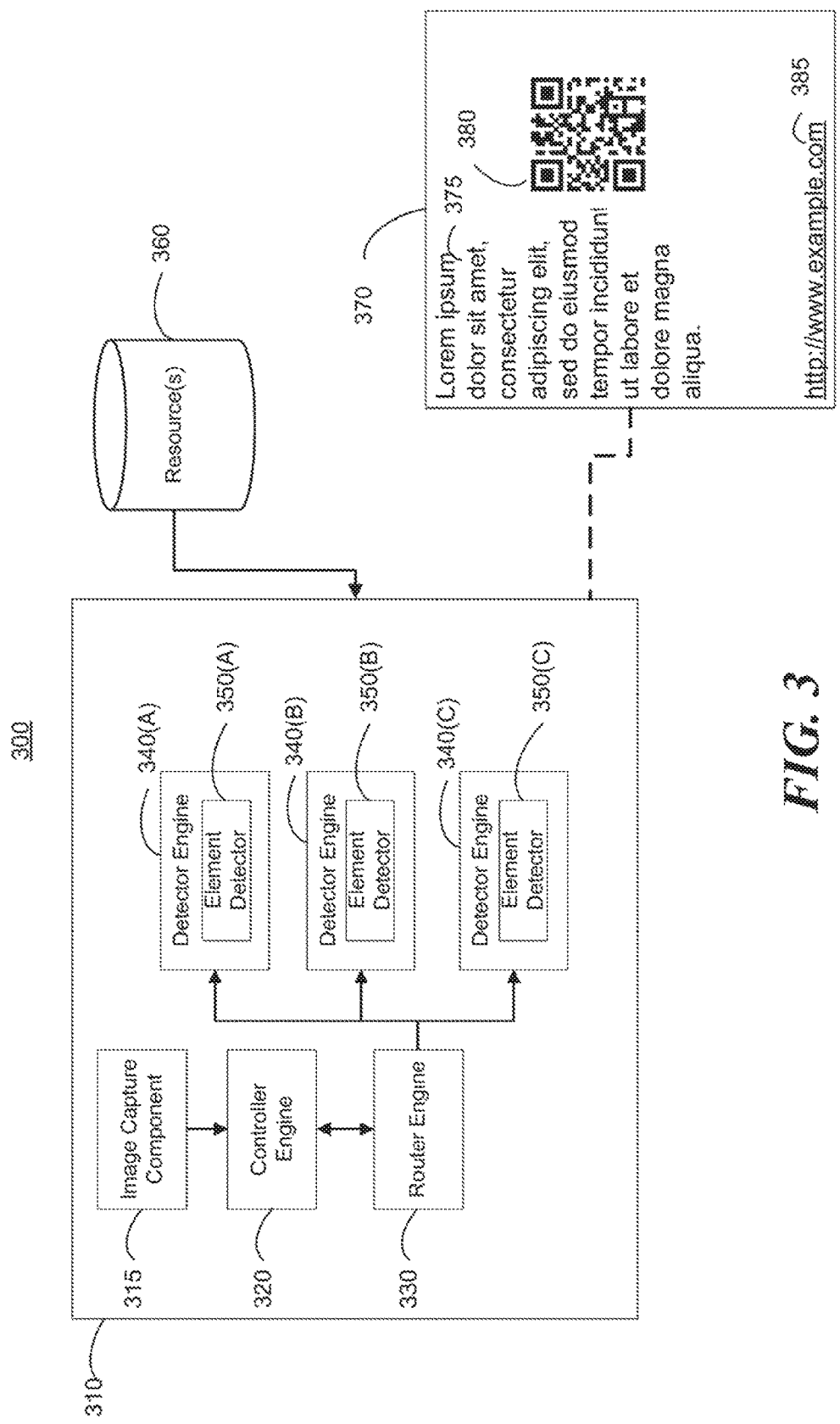
FIG. 3 is a block diagram of an example system for image recognition.

FIG. 3 is a block diagram of a system 300 for image recognition consistent with disclosed implementations. System 300 may comprise a computing device 310 comprising an image capture component 315, a controller engine 320, a router engine 330, and a plurality of detector engines 340(A)-(C). Each of plurality of detector engines 340(A)-(C) may comprise a respective element detector 350(A)-(C). System 300 may also comprise a resource store 360 and an example document 370. Computing device 310 may comprise, for example, a general and/or special purpose computer, server, mainframe, desktop, laptop, tablet, smart phone, game console, and/or any other system capable of providing computing capability consistent with providing the implementations described herein.

Each of engines 320, 330, and 340(A)-(C) of system 300 may comprise any combination of hardware and programming to implement the functionalities of the respective engine. In examples described herein, such combinations of hardware and programming may be implemented in a number of different ways. For example, the programming for the engines may be processor executable instructions stored on a non-transitory machine-readable storage medium and the hardware for the engines may include a processing resource to execute those instructions. In such examples, the machine-readable storage medium may store instructions that, when executed by the processing resource, implement engines 320, 330, and 340(A)-(C). In such examples, system 300 may comprise the machine-readable storage medium storing the instructions and the processing resource to execute the instructions, or the machine-readable storage medium may be separate but accessible to system 300 and the processing resource.

Image capture component 315 may comprise, for example, an integrated camera and/or plurality of cameras. The camera(s) may continuously and/or intermittently scan objects, documents, and/or areas in their field of view and create a plurality of digital images wherein each individual image may comprise a single frame of the scan. The image frames may be sampled by image capture component 315 at a fixed and/or variable rate (e.g., 30 frames per second).

Example document 370 may comprise a plurality of text 375, and embedded matrix barcode element 380 and an embedded text element 385. In some embodiments, image capture component 315 may capture a plurality of image frames of example document 370.

Controller engine 320 may receive a plurality of image frames associated with document 370 from image capture component 315, determine whether a first image frame of the plurality of image frames is in focus, and in response to determining that the first image frame of the plurality of image frames is not in focus, discard the first image frame. In some embodiments, controller engine 320 may receive a plurality of image frames from image capture component 315. Each image frame may be associated with a content source such as a document, sign, displayed presentation, and/or other visual display. For example, some of the image frames may comprise individual captures of a page of a document. In some embodiments, subsets of the image frames may comprise little variation from one another due to the sampling rate.

Router engine 330 may select, for each of the plurality of image frames, a destination element detector from the plurality of element detectors, wherein each of the plurality of element detectors are associated with a detector engine comprising a different element detector type and wherein the router engine selects each of the plurality of element detectors in a round robin sequence, and route each of the plurality of image frames to the selected destination element detector of the plurality of element detectors. In some embodiments, router engine 330 may route each of the plurality of image frames sequentially to a respective one of a detector engines 340(A)-(C). For example, a first image frame may be routed to detector engine 340(A), a second image frame may be routed to detector engine 340(B), a third image frame may be routed to detector engine 340(C), and, in a round robin sequence, a fourth image frame may be routed back to detector engine 340(A). In some embodiments, no other of the plurality of element detectors will receive the same unique captured frame, although the image frames may be similar.

In some embodiments, the sequential routing may comprise a round robin style routing wherein all of the element detectors may each receive one unique image frame before any element detector receives a second image frame. The image frames may, for example, be routed to the element detectors in the same order in each round of image frames.

In some embodiments, the sequential routing may comprise an adaptive style routing wherein frame routing may be based on the processing of each image frame by the respective element detector. For example, all of the element detectors may each receive a different unique image frame, but further image frames may be routed to a respective element detector after it has finished processing the first unique image frame. In some embodiments, this may result in faster processing element detectors receiving more frames than slower processing element detectors.

Detector engines 340(A)-(C) may determine whether the at least one of the plurality of element detectors has recognized an embedded element, such as embedded matrix barcode element 380 and/or embedded text element 385 and, in response to determining that the at least one of the plurality of element detectors has recognized the embedded element, cause a resource associated with the recognized embedded element to be retrieved. In some embodiments, detector engines 340 (A)-(C) may determine whether the respective one of the plurality of element detectors has recognized an embedded element. For example, each of the plurality of element detectors may be associated with a different element recognizer, such as a watermark recognizer, a bar code recognizer, a QR code recognizer, a text string recognizer, a uniform resource locator recognizer, a facial recognizer, an image recognizer, a stenographic halftone recognizer, and/or a microdot recognizer. The element recognizers may digitally process the image frames for elements within the image frame that correspond to a particular type of element associated with an external resource.

A first unique image frame may be routed to a first element detector comprising a matrix barcode recognizer, for example, while a second unique image frame may be routed to a second element detector comprising a text string recognizer. A third unique image frame may be routed to a third element detector comprising a facial recognizer, and so on.

Detector engine 340(A) may cause a resource associated with the recognized embedded element to be retrieved, such as a resource from resource store 360. For example, matrix barcode element 380 recognized by a matrix barcode recognizer may comprise a link to a video file that may be retrieved over a network, such as a corporate network, cellular network, or public network like the Internet. For another example, a face may be recognized by a facial recognizer may be associated with retrieving a contact information resource, such as an entry in a corporate directory and/or a social media profile. In some embodiments, detector engine(s) 340(A)-(C) may execute a callback to another component of device 100, such as controller engine 320 and/or router engine 330 to retrieve the resource from resource store 360 after recognizing the embedded element.

Router engine 330 may route each image frame to a different element detector. For example, a first image frame may be routed to detector engine 340(A) wherein element detector 350(A) comprises a matrix barcode recognizer element detector. A second image frame may be routed to detector engine 340(B) wherein element detector 350(B) comprises a facial recognizer element detector. A third image frame may be routed to detector engine 340(C) wherein element detector 350(C) comprises a uniform resource locator recognizer element detector.

Element detector 350(A) may recognize matrix barcode element 380 and cause a resource identified by matrix barcode 380 to be retrieved. For example, detector engine 340(A) may perform a callback to controller engine 320 comprising information identifying the location and of the resource in resource store 360. Similarly, element detector 350(C) may recognize text element 385 as a uniform resource locator (URL) and cause a resource identified by the URL, such as a web page, to be retrieved.

The disclosed examples may include systems, devices, computer-readable storage media, and methods for progressive buffer generation. For purposes of explanation, certain examples are described with reference to the components illustrated in FIGS. 1-3. The functionality of the illustrated components may overlap, however, and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples.

Moreover, as used in the specification and the appended claims, the singular forms "a," "an," and "the" are intended to include the plural forms as well, unless the context indicates otherwise. Additionally, although the terms first, second, etc. may be used herein to describe various elements, these elements should not be limited by these terms. Instead, these terms are only used to distinguish one element from another.

Further, the sequence of operations described in connection with the Figures are examples and are not intended to be limiting. Additional or fewer operations or combinations of operations may be used or may vary without departing from the scope of the disclosed examples. Thus, the present disclosure merely sets forth possible examples of implementations, and many variations and modifications may be made to the described examples. All such modifications and variations are intended to be included within the scope of this disclosure and protected by the following claims.

We claim:

1. A non-transitory machine-readable storage medium comprising instructions for image recognition which, when executed by a processor, cause the processor to:
receive a plurality of image frames;
route each of the plurality of image frames sequentially to a respective one of a plurality of element detectors in a round-robin sequence or in an adaptive sequence;
determine whether one of the plurality of element detectors has recognized an embedded element; and
in response to determining that the one of the plurality of element detectors has recognized the embedded element, retrieve a resource associated with the recognized embedded element.

2. The non-transitory machine-readable medium of claim 1, wherein each of the plurality of element detectors is associated with a different element recognizer.

3. The non-transitory machine-readable medium of claim 2, wherein the different element recognizers associated with the element detectors comprise at least one of the following: a watermark recognizer, a bar code recognizer, a matrix barcode recognizer, a text string recognizer, a uniform resource locator recognizer, a facial recognizer, an image recognizer, a stenographic halftone recognizer, and a microdot recognizer.

4. The non-transitory machine-readable medium of claim 1, wherein the instructions to route each of the plurality of image frames sequentially to the respective one of the plurality of element detectors comprises instructions to route the plurality of image frames sequentially to respective element detectors among the plurality of element detectors in the round robin sequence.

5. The non-transitory machine-readable medium of claim 1, wherein the instructions to route each of the plurality of image frames sequentially to the respective one of the plurality of element detectors comprises instructions to route each of the plurality of image frames sequentially to each of the plurality of element detectors in the adaptive sequence.

6. The non-transitory machine-readable medium of claim 1, wherein the instructions to receive the plurality of image frames further cause the processor to pre-filter each of the plurality of image frames.

7. The non-transitory machine-readable medium of claim 6, wherein the instructions to pre-filter each of the plurality of each frames comprise instructions to:
determine whether a first image frame of the plurality of image frames is in focus; and
in response to determining that the first image frame of the plurality of image frames is not in focus, discard the first image frame instead of routing the first image frame to a respective one of a plurality of element detectors.

8. A computer-implemented method for image recognition comprising:
registering, by a processor, a plurality of element detectors;
receiving a plurality of image frames from an image capture component;
selecting, for each of the plurality of image frames, a different destination element detector from among the plurality of element detectors;
for each of the plurality of image frames, routing the image frame to the selected destination element detector among of the plurality of element detectors;
determining whether one of the selected destination element detectors of the plurality of element detectors has recognized an embedded element; and
in response to determining that the one of the selected destination element detector of the plurality of element detectors has recognized the embedded element, pausing the routing of the image frames to the selected destination element detectors and retrieving a resource associated with the recognized embedded element.

9. The computer-implemented method of claim 8, wherein each of the plurality of element detectors is associated with a different element recognizer.

10. The computer-implemented method of claim 9, wherein the different element recognizers associated with the element detectors comprise at least one of the following: a watermark recognizer, a bar code recognizer, a matrix barcode recognizer, a text string recognizer, a uniform resource locator recognizer, a facial recognizer, an image recognizer, a stenographic halftone recognizer, and a microdot recognizer.

11. The computer implemented method of claim 8, further comprising resuming routing frames to the one of the selected destination element detectors of the plurality of element detectors after the resource has been retrieved.

12. The computer implemented method of claim 8, wherein selecting the destination element detector of the plurality of element detectors comprises identifying a sequential order for selecting the different destination element detectors of the plurality of element detectors.

13. The computer-implemented method of claim 8, wherein selecting the different destination element detector of the plurality of element detectors comprises selecting each of the plurality of element detectors in an adaptive sequence.

14. A system for image recognition, comprising:
an image capture component;
a controller engine to:
receive a plurality of image frames associated with a document from the image capture component,
determine whether a first image frame of the plurality of image frames is in focus, and
in response to determining that the first image frame of the plurality of image frames is not in focus, discard the first image frame;
a router engine to:
select, for each of the plurality of image frames, a different destination element detector from the plurality of element detectors, and
route each respective image frame of the plurality of image frames to the selected different destination element detector of the plurality of element detectors; and
a detector engine to:
determine whether at least one of the plurality of element detectors has recognized an embedded element in the respective image frame of the plurality of image frames; and
in response to determining that at least one of the plurality of element detectors has recognized the embedded element, cause a resource associated with the recognized embedded element to be retrieved.

* * * * *

UNITED STATES PATENT AND TRADEMARK OFFICE
CERTIFICATE OF CORRECTION

PATENT NO. : 10,210,385 B2
APPLICATION NO. : 15/544695
DATED : February 19, 2019
INVENTOR(S) : Andre Rabelo et al.

Page 1 of 1

It is certified that error appears in the above-identified patent and that said Letters Patent is hereby corrected as shown below:

In the Claims

In Column 10, Line 22, in Claim 11, delete "computer implemented" and insert -- computer-implemented --, therefor.

In Column 10, Line 26, in Claim 12, delete "computer implemented" and insert -- computer-implemented --, therefor.

Signed and Sealed this
Twenty-sixth Day of November, 2019

Andrei Iancu
*Director of the United States Patent and Trademark Office*